(12) United States Patent
Cady et al.

(10) Patent No.: US 9,853,301 B2
(45) Date of Patent: Dec. 26, 2017

(54) THERMAL CONDITIONING FLUIDS FOR AN UNDERWATER CRYOGENIC STORAGE VESSEL

(71) Applicant: The Boeing Company, Chicago, IL (US)

(72) Inventors: Edwin C. Cady, Tustin, CA (US); Daniel A. Watts, Surfside, CA (US); Gary D. Grayson, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 14/512,752

(22) Filed: Oct. 13, 2014

(65) Prior Publication Data

US 2017/0012303 A1     Jan. 12, 2017

Related U.S. Application Data

(62) Division of application No. 12/552,136, filed on Sep. 1, 2009, now Pat. No. 8,859,153.

(51) Int. Cl.
*H01M 8/04* (2016.01)
*H01M 8/04014* (2016.01)
(Continued)

(52) U.S. Cl.
CPC ... *H01M 8/04014* (2013.01); *H01M 8/04029* (2013.01); *H01M 8/04052* (2013.01);
(Continued)

(58) Field of Classification Search
CPC .................. H01M 8/04074; H01M 8/0668
See application file for complete search history.

(56) References Cited

U.S. PATENT DOCUMENTS 662,217 A    11/1900    Brady
1,485,665 A    3/1924    Botner
(Continued)

FOREIGN PATENT DOCUMENTS

JP    2004214169    7/2004
WO    WO 2008/061345    5/2008

OTHER PUBLICATIONS

AIAA Paper 2006-7454, The Advanced Cryogenic Evolved Stage (ACES), by J. F. LeBar and E. C. Cady, Sep. 2006, 6 pages.
(Continued)

*Primary Examiner* — Stephan Essex
(74) *Attorney, Agent, or Firm* — Miller, Matthias & Hull LLP

(57) ABSTRACT

Technologies are described herein for conditioning fluids stored in an underwater cryogenic storage vessel designed for use in a fuel system of an underwater vehicle. According to one aspect of the disclosure, a fuel system includes a fuel cell and a storage vessel, which stores a first fluid that is supplied to the fuel cell and a second fluid that is produced by the fuel cell. The fuel system also includes a thermal conditioning module that receives the first fluid from the storage vessel and receives the second fluid from the fuel cell. The first fluid stored in the storage vessel is conditioned by absorbing heat from the second fluid, such that the fuel cell receives the conditioned first fluid. The second fluid received from the fuel cell is in gaseous state and is converted to a liquid. The liquid second fluid is stored in the storage vessel.

20 Claims, 8 Drawing Sheets

(51) Int. Cl.
　　*H01M 8/0668* (2016.01)
　　*H01M 8/04029* (2016.01)
　　*H01M 8/04007* (2016.01)
　　*H01M 8/04082* (2016.01)
　　*H01M 8/0432* (2016.01)
　　*H01M 8/0438* (2016.01)
　　*H01M 8/04746* (2016.01)

(52) U.S. Cl.
　　CPC ... *H01M 8/04074* (2013.01); *H01M 8/04082* (2013.01); *H01M 8/04208* (2013.01); *H01M 8/04373* (2013.01); *H01M 8/04425* (2013.01); *H01M 8/04753* (2013.01); *H01M 8/0668* (2013.01)

(56) References Cited

U.S. PATENT DOCUMENTS

| | | |
|---|---|---|
| 2,900,800 A | 8/1959 | Loveday |
| 3,030,780 A | 4/1962 | Loveday |
| 3,069,045 A | 12/1962 | Wilfried et al. |
| 3,282,459 A | 11/1966 | Wilson |
| 3,514,006 A | 5/1970 | Molnar |
| 4,120,421 A | 10/1978 | Prost |
| 4,287,720 A | 9/1981 | Barthel |
| 4,337,624 A | 7/1982 | Hamon |
| 4,767,593 A | 8/1988 | Wedellsborg |
| 4,807,833 A | 2/1989 | Pori |
| 5,005,362 A | 4/1991 | Weltmer et al. |
| 5,375,423 A | 12/1994 | Delatte |
| 6,128,908 A | 10/2000 | Gustafson |
| 6,708,502 B1 | 3/2004 | Aceves et al. |
| 7,568,352 B2 | 8/2009 | Grayson et al. |
| 7,850,034 B2 | 12/2010 | Munshi et al. |
| 8,100,284 B2 | 1/2012 | Schlag et al. |
| 8,651,313 B1 | 2/2014 | Cady et al. |
| 2002/0008111 A1 | 1/2002 | Pelloux-Gervais et al. |
| 2005/0191534 A1* | 9/2005 | Kim .............. B01J 19/249 429/412 |
| 2007/0264543 A1 | 11/2007 | Kim et al. |

OTHER PUBLICATIONS

AIAA Paper 90-3533, Extended Duration Orbiter presented @ the AIAA Space Programs and Technologies Conference, Sep. 25-28, 1990 / Huntsville, AL by D. Germany, 6 pages.

IEEE Journal of Oceanic Engineering, vol. 32, No. 2, Apr. 2007, pp. 365-372. Entitled: "Unmanned Underwater Vehicle Fuel Cell Energy/Power System Technology Assessment", by Kevin L. Davies and Robert M. Moore.

U.S. Office Action dated Aug. 14, 2012 in U.S. Appl. No. 12/552,130.

U.S. Office Action dated Jan. 22, 2013 in U.S. Appl. No. 12/552,130.

Notice of Allowance dated Sep. 16, 2013 in U.S. Appl. No. 12/552,130.

U.S. Office Action dated Feb. 4, 2013 in U.S. Appl. No. 12/552,136.

U.S. Office Action dated Sep. 27, 2013 in U.S. Appl. No. 12/552,136.

Notice of Allowance dated May 29, 2014 in U.S. Appl. No. 12/552,136.

* cited by examiner

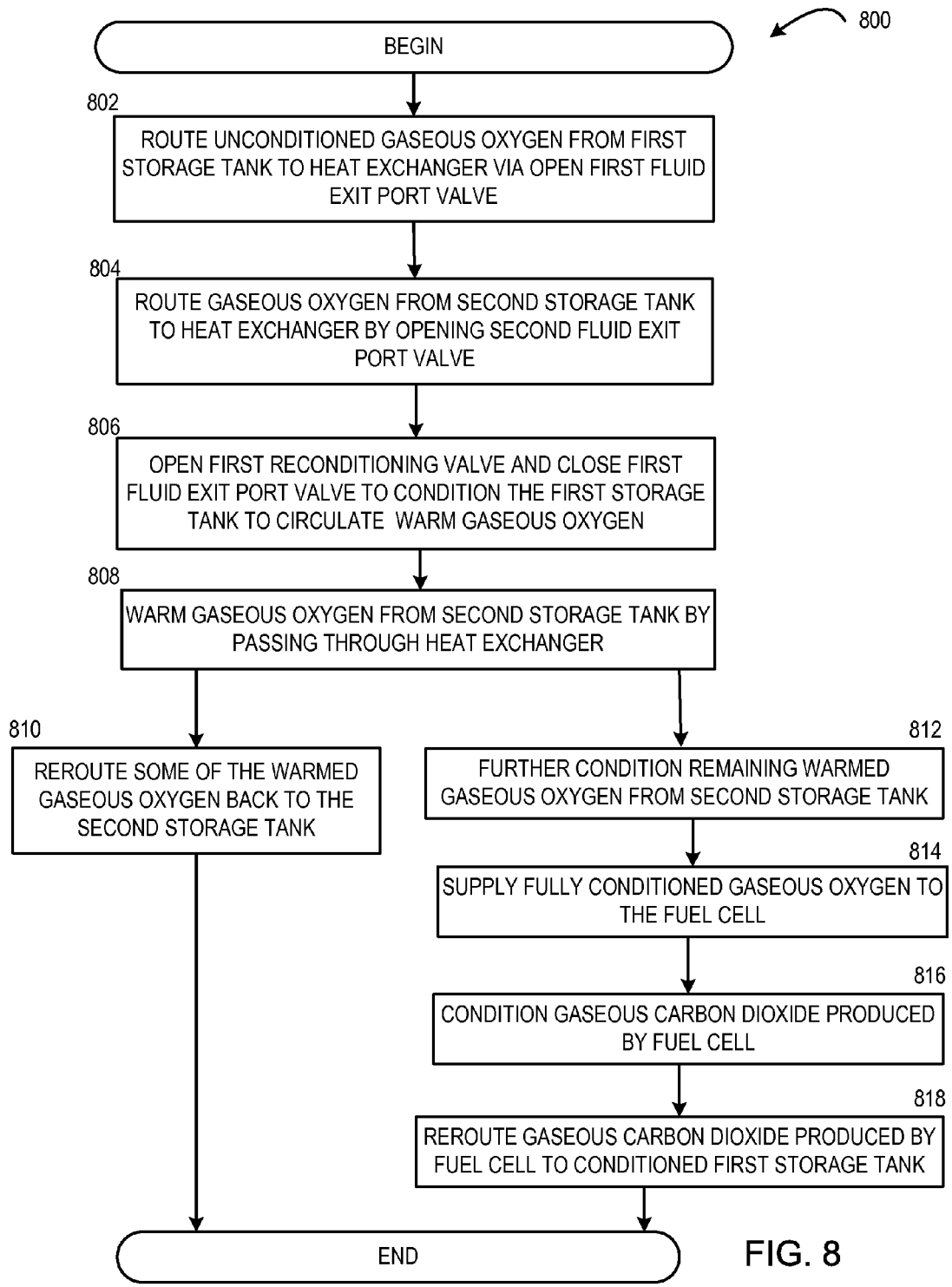

THERMAL CONDITIONING FLUIDS FOR AN UNDERWATER CRYOGENIC STORAGE VESSEL

CROSS-REFERENCE OF RELATED APPLICATIONS

This application is a division of co-pending U.S. application Ser. No. 12/552,136, filed on Sep. 1, 2009, entitled, "Thermal Conditioning Fluids For An Underwater Cryogenic Storage Vessel", which is related to U.S. application Ser. No. 14/162,188, filed on Jan. 23, 2014, entitled "Underwater Cryogenic Storage Vessel and Method of Using Same," and is also related to U.S. Pat. No. 8,651,313, issued on Feb. 18, 2014, entitled, "Underwater Cryogenic Storage Vessel", which is expressly incorporated herein by reference in its entirety.

GOVERNMENT RIGHTS

This invention was made with Government support under contract number HR0011-06-C-0073 awarded by the United States Navy. The government has certain rights in this invention.

FIELD OF THE DISCLOSURE

The present disclosure relates generally to fuel systems, and in particular to thermal conditioning cryogenic fluids associated with fuel systems for underwater vehicles.

BACKGROUND

Some vehicles, such as underwater vehicles, have a fuel system that uses a fuel cell to provide power to the vehicle. Typically, these fuel cells are supplied with kerosene and oxygen to produce power. These fuel cells also produce carbon dioxide as an effluent. In such power systems, the oxygen supplied to the fuel cell is stored in storage tanks, which are connected to the fuel cell. The resulting carbon dioxide is collected and stored in separate storage tanks.

In existing power systems of such vehicles, the oxygen is stored as a liquid in storage tanks arranged adjacent to each other. Before supplying the oxygen to the fuel cell, the liquid oxygen in these tanks may need to be boiled off, such that the oxygen supplied to the fuel cell is in a gaseous state. However, the heat supplied to one of the tanks for boiling off the oxygen may dissipate to the other tanks in the vicinity, thereby increasing the temperature and consequently, the pressure in the storage tanks adjacent to the tank that is being supplied with heat.

In an attempt to reduce the effect of the dissipated heat on the other tanks located in the vicinity, the tanks are conventionally made with insulated vacuum gaps to reduce the amount of heat that may leak into the unused tanks. However, because of the insulated gaps, these tanks take up a larger volume. Further, because there may still be some heat leak into the storage tanks despite the insulated gaps around the storage tanks, the fluids in the tanks may expand due to an increase in pressure. In order to account for the possibility of fluid expansion, these conventional tanks are typically only partially-filled, thereby requiring tanks with greater volume to store the amount of fuel desired.

It is with respect to these and other considerations that the disclosure made herein is presented.

SUMMARY

Technologies are described herein for thermal conditioning fluids associated with a fuel system. According to one aspect of the disclosure, a fuel system includes a fuel cell and a storage vessel. The storage vessel is configured to store a first fluid that is supplied to the fuel cell and a second fluid that is supplied by the fuel cell. The first fluid includes a liquid first fluid and a gaseous first fluid, and the second fluid includes a liquid second fluid and a gaseous second fluid. The fuel system also includes a thermal conditioning module that is configured to receive the gaseous first fluid from the storage vessel and also to receive the gaseous second fluid from the fuel cell. The gaseous first fluid stored in the storage vessel is conditioned by absorbing heat from the gaseous second fluid, such that the fuel cell receives the gaseous first fluid from the thermal conditioning module. The gaseous second fluid received from the fuel cell is converted to the liquid second fluid. The liquid second fluid is then stored in the storage vessel.

In another aspect of the present disclosure, a fuel system includes a thermal conditioning module. The thermal conditioning module is configured to receive a gaseous first fluid from a storage vessel and a gaseous second fluid from a fuel cell. The gaseous first fluid from the storage vessel is conditioned by absorbing heat from the gaseous second fluid to create a conditioned gaseous first fluid. A first portion of the conditioned gaseous first fluid is provided to the fuel cell, while a second portion is provided back to the storage vessel. The gaseous second fluid from the fuel cell is converted to a liquid second fluid and provided to the storage vessel.

In yet another aspect, a fuel system includes a fuel cell, a storage vessel, and a thermal conditioning module. The storage vessel includes two storage tanks, each configured to store a first fluid to be supplied to the fuel cell. The storage vessel also includes a storage compartment configured to store a liquid second fluid supplied by the fuel cell. The thermal conditioning module receives the first fluid from the storage vessel and receives a gaseous second fluid from the fuel cell. The first fluid is conditioned by absorbing heat from the gaseous second fluid from the fuel cell to create a conditioned first fluid. A portion of the conditioned first fluid is provided to the fuel cell and a second portion is provided back to the storage vessel. The gaseous second fluid from the fuel cell is converted to a liquid second fluid and provided to the storage compartment for storage.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a logical flow diagram illustrating a routine for conditioning the storage tank of the storage vessel, according to embodiments described herein.

DETAILED DESCRIPTION

Figure 1:
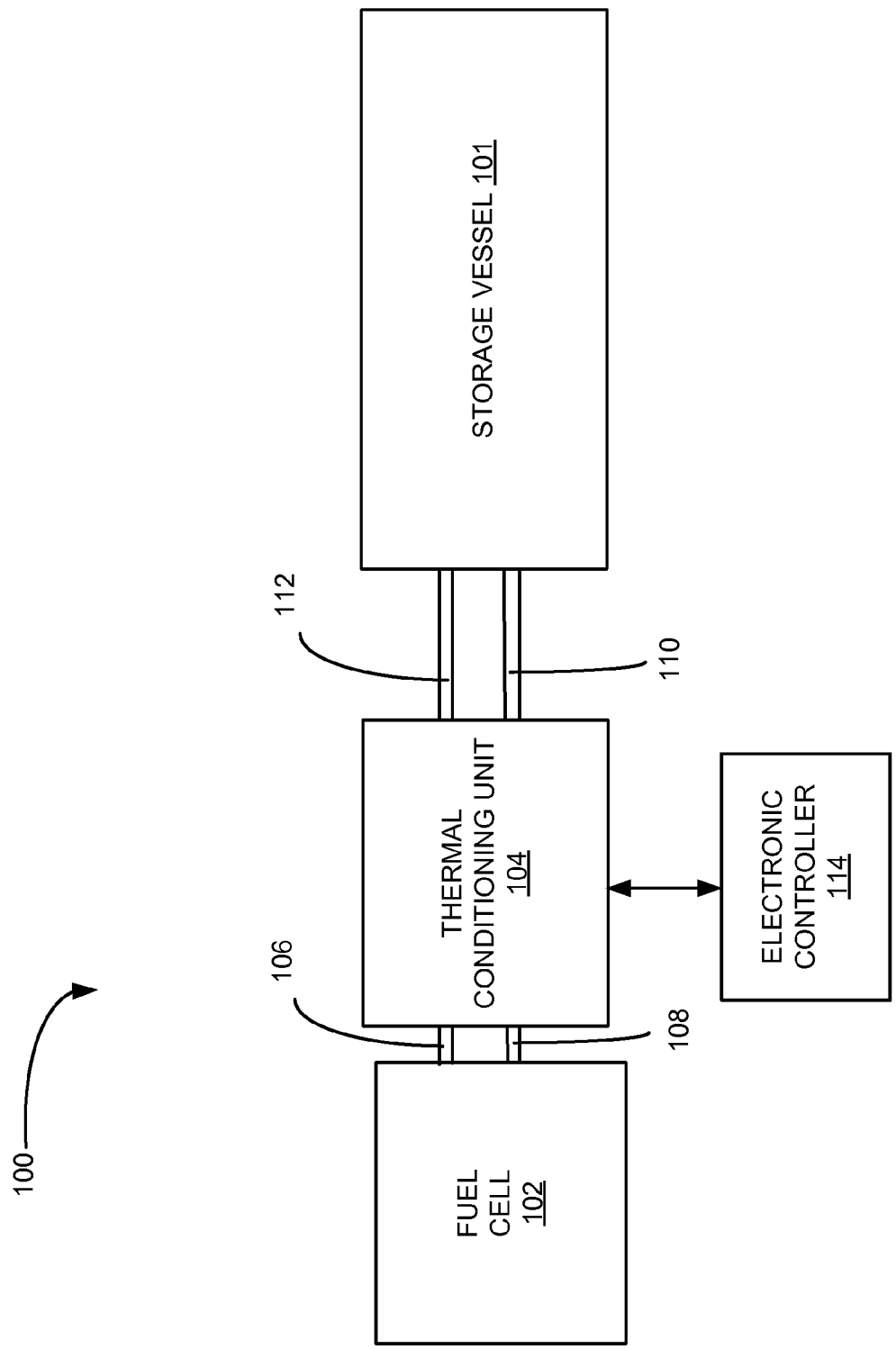
FIG. 1 is a block diagram illustrating a fuel system comprising a fuel cell, a thermal conditioning module, and a storage vessel, according to embodiments described herein.

The following detailed description is directed to technologies for conditioning fluids that are and will be stored in a storage vessel. In the following detailed description, references are made to the accompanying drawings that form a part hereof, and which are shown by way of illustration, specific embodiments, or examples. Referring now to the drawings, in which like numerals represent like elements through the several figures, a fuel system according to the various embodiments will be described. As described above, the fuel system may be utilized to provide power to an underwater vehicle, wherein the fuel system includes a fuel cell and a thermal conditioning module configured to receive stored fuel and to condition the fuel before supplying the fuel to the fuel cell.

FIG. 1 illustrates a fuel system 100 that includes a fuel storage vessel 101, a fuel cell 102, a thermal conditioning module 104 and an electronic controller 114. The electronic controller 114 may be a computer, a processor, or any other hardware and/or software component that is configured to control the various components associated with the fuel system 100. In various embodiments, the electronic controller 114 may not be a part of the fuel system 100 but may still be configured to control the various components associated with the fuel system 100.

According to embodiments, the fuel cell 102 may be configured to receive a first fluid, such as gaseous oxygen, as a reactant from the thermal conditioning module 104, and to produce a gaseous second fluid, such as gaseous carbon dioxide as an effluent, which is then supplied to the thermal conditioning module 104. In some embodiments where the venting of gases may be undesirable, the first fluid may be stored as a liquid in the storage vessel 101. In embodiments, the first fluid may be stored in liquid form and in gas form, such that the gaseous first fluid is supplied from the storage vessel to the thermal conditioning module 104. Further, the gaseous second fluid produced by the fuel cell 102 may be conditioned by the thermal conditioning module 104, such that the gaseous second fluid is converted to a liquid second fluid and stored in the same or different storage vessel. In various embodiments, the fuel cell 102 utilizes gaseous oxygen and kerosene to generate energy and produces gaseous carbon dioxide as an effluent. It should be appreciated that the kerosene, or any other reactant of the fuel cell 102, may be supplied to the fuel cell 102 from a reactant source (not shown).

The thermal conditioning module 104 may be configured to receive the gaseous first fluid stored in the storage vessel 101 via at least one of a plurality of fluid exit ports 112, which may route fluids stored in the storage vessel 101 to the thermal conditioning module 104. The thermal conditioning module 104 may also condition the gaseous first fluid as the gaseous first fluid travels through the thermal conditioning module 104, after which the thermal conditioning module 104 supplies the conditioned gaseous first fluid to the fuel cell 102. The fuel cell 102 may receive the conditioned gaseous first fluid from the thermal conditioning module 104 via a passage 106. Upon receiving the conditioned gaseous first fluid, the fuel cell 102 may produce the gaseous second fluid, which is supplied to the thermal conditioning module 104 via a passage 108. The thermal conditioning module 104 may be configured to condition the gaseous second fluid to the liquid second fluid as the second fluid passes through the thermal conditioning module 104. Upon conditioning the gaseous second fluid to liquid second fluid, the thermal conditioning module 104 may deliver the liquid second fluid to the storage vessel 101 via a plurality of fluid entry ports 110. The liquid second fluid is then stored in a location of the storage vessel from where the first fluid is not being supplied. Further details regarding the thermal conditioning module 104 will be described in regard to FIGS. 5-8.

The passage 106 may be configured to supply the conditioned gaseous first fluid from the thermal conditioning module 104 to the fuel cell 102. The passage 108 may be configured to supply the unconditioned gaseous second fluid from the fuel cell 102 to the thermal conditioning module 104. In addition, the fuel system also includes a plurality of fluid entry ports 110 that may be configured to allow fluids to flow from the thermal conditioning module to the storage vessel. Similarly, the fuel system also includes a plurality of fluid exit ports 112 that may be configured to allow fluids to flow from the storage vessel to the thermal conditioning module. Details regarding the plurality of fluid entry ports 110 and the fluid exit ports 112 will be described in regard to FIGS. 2-4.

Figure 2:
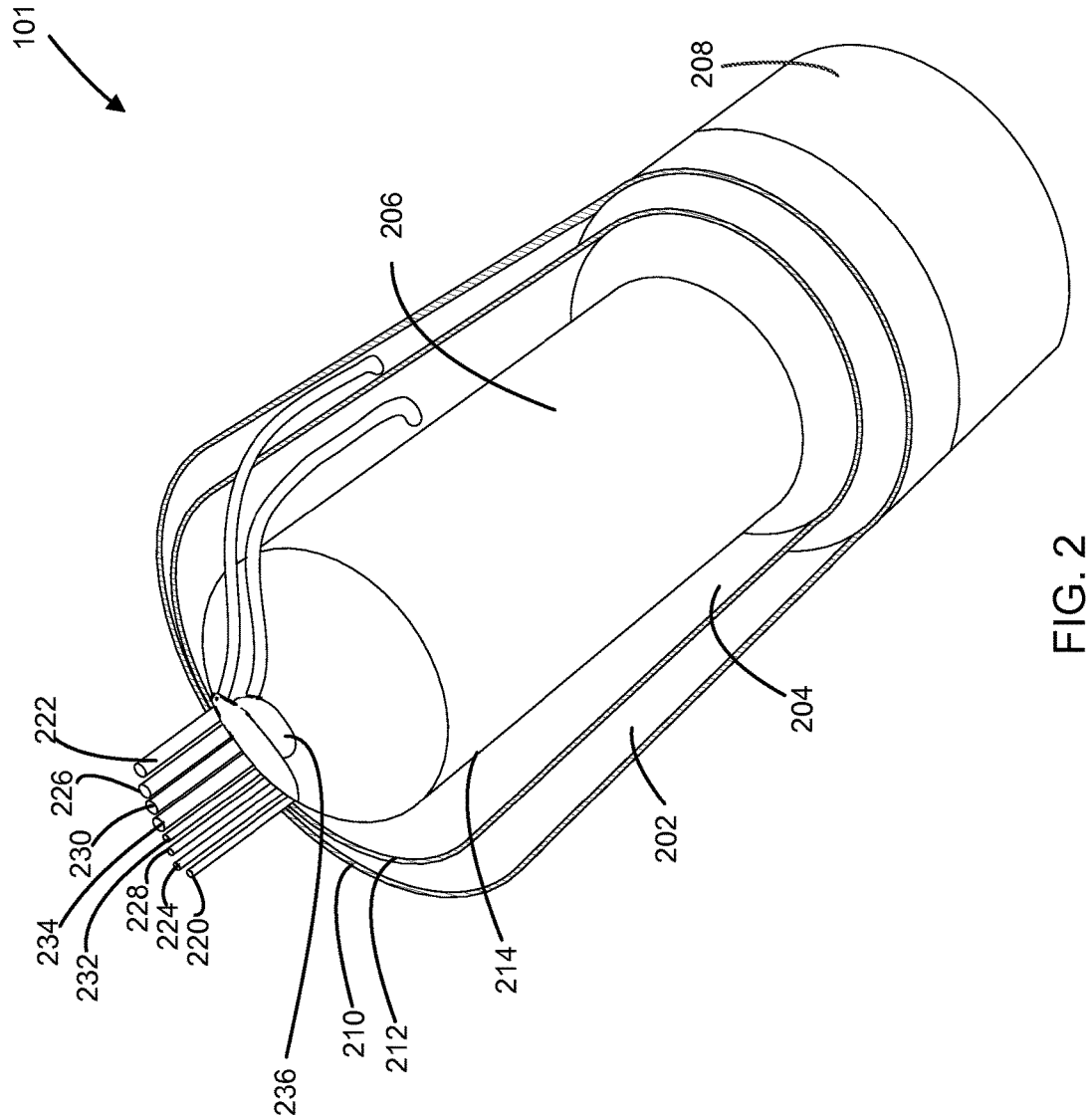
FIG. 2 is a cut-open view of the storage vessel, according to embodiments described herein.
Figure 3:
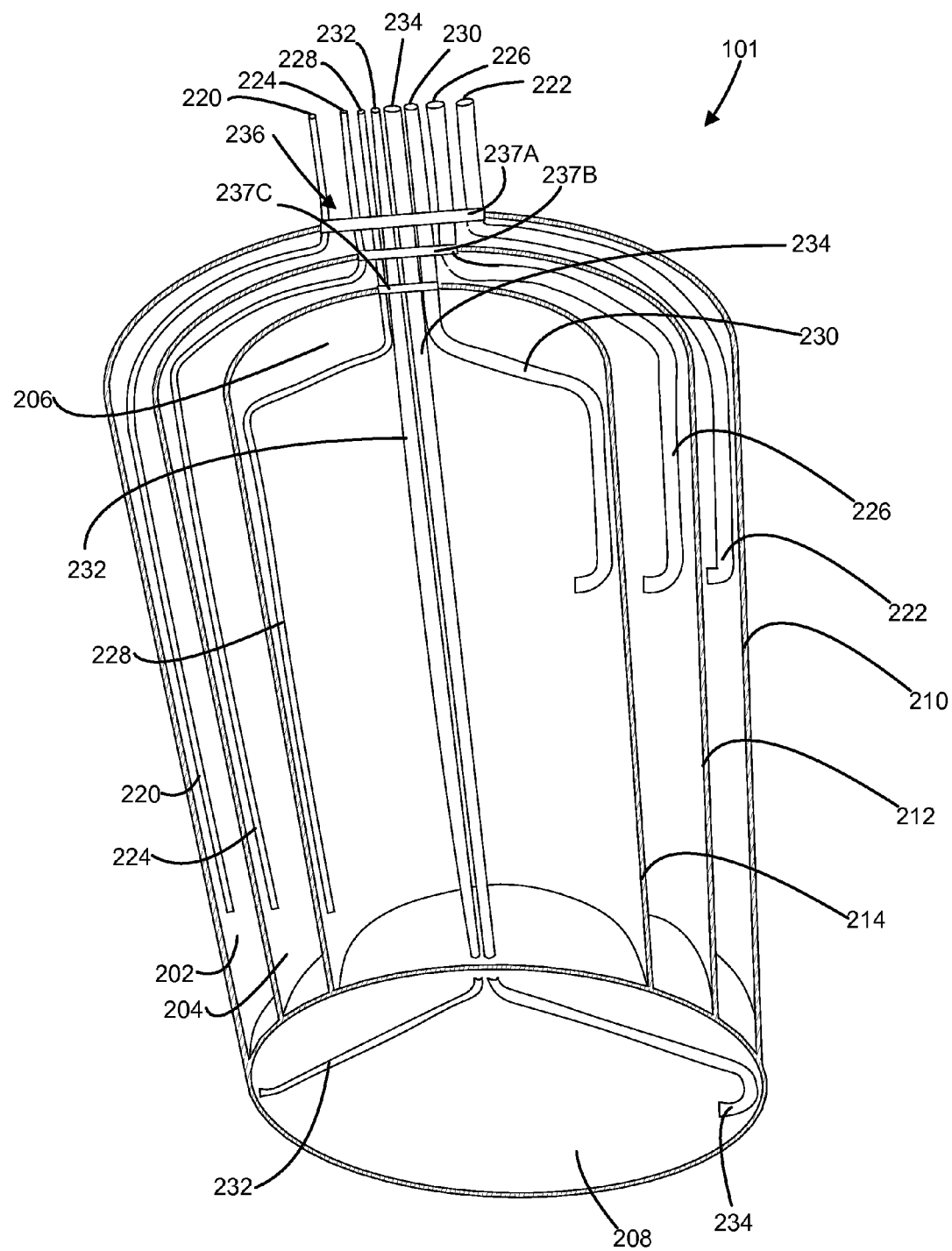
FIG. 3 is a partial cut-open view and partial bottom view of the storage vessel, according to embodiments described herein.
Figure 4:
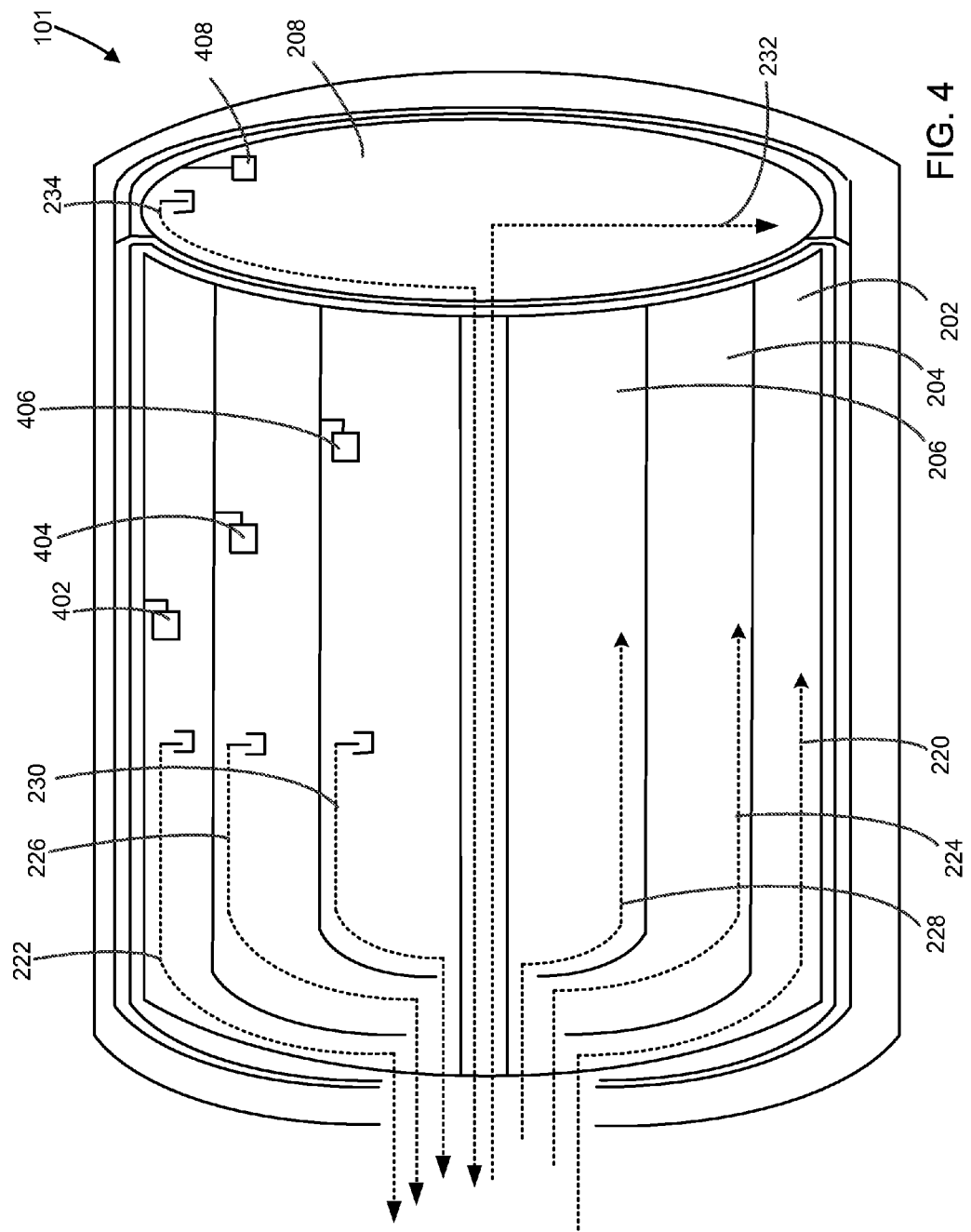
FIG. 4 is a line diagram illustrating the flow of fluids within the storage vessel, according to embodiments described herein.

Referring now to FIGS. 2-4, details regarding the storage vessel 101 are shown. FIG. 2 illustrates the storage vessel 101 that includes storage tanks 202, 204, 206 and a storage compartment 208 that is positioned adjacent to one end of the storage tanks 202, 204, 206. It should be appreciated that the storage vessel 101 may include any number of storage tanks and any number of storage compartments within the storage vessel 101. In one embodiment, the storage vessel 101 may not include any storage compartments. In embodiments where there is more than one storage compartment, the storage compartments may also be arranged concentrically or in any other fashion. The storage compartment may be located anywhere within the storage vessel 101, and may store the same or different fluid as the storage tanks 202, 204, 206.

In the present embodiment, the storage vessel 101 includes the first storage tank 202, the second storage tank 204 and the third storage tank 206 concentrically arranged such that the first storage tank 202 is surrounding the second storage tank 204, and the second storage tank 204 is surrounding the third storage tank 206. The first storage tank 202 may include a first fluid entry port 220 and a first fluid exit port 222. The second storage tank 204 may include a second fluid entry port 224 and a second fluid exit port 226, and the third storage tank 206 may include a third fluid entry port 228 and a third fluid exit port 230. In addition, the storage compartment 208 may also include a compartment fluid entry port 232 and a compartment fluid exit port 234.

The plurality of fluid entry ports 110 (shown in FIG. 1) may include at least the first fluid entry port 220, the second fluid entry port 224, the third fluid entry port 228, and the compartment fluid entry port 232. The plurality of fluid exit ports 112 (shown in FIG. 1) may include at least the first fluid exit port 222, the second fluid exit port 226, the third fluid exit port 230, and the compartment fluid exit port 234. Details of the plurality of fluid entry ports 110 and the plurality of fluid exit ports 112 will be described in detail below in regard to FIG. 3.

In various embodiments, the third storage tank 206 may be nested inside the second storage tank 204, which may be nested inside the first storage tank 202. Each of the first, second, and third storage tanks 202, 204, 206 have a bottom end, which is adjacent the storage compartment 208. In some embodiments, each of the three storage tanks 202, 204, 206 and the storage compartment 208 may contain the same volume of fluid or may contain different volumes of fluid.

According to various embodiments, the storage vessel 101 may store one fluid or more than one fluid. In some embodiments, the first storage tank 202 may store a first fluid, the second storage tank 204 may store a second fluid, and the third storage tank 206 may store a third fluid. Further, the storage compartment 208 may be used to store the same or a different fluid as the storage tanks. In some embodiments, the three storage tanks 202, 204, 206 and the storage compartment 208 are sealed, such that the fluid from one of the storage tanks 202, 204, 206 and the storage compartment 208 may not flow into another storage tank 202, 204, 206 or the storage compartment 208.

In the present embodiment, as described above, the storage vessel 101 may be utilized for storing liquid oxygen and liquid carbon dioxide. Because of the very low boiling points of these liquids, it is important that the storage tanks 202, 204, 206 that store these liquids maintain low temperatures, such that the liquids do not boil off to gas and thereby increase the pressure inside these tanks 202, 204, 206. Therefore, it may be desirable to protect the storage tanks 202, 204, 206 from external environmental conditions by covering them with insulating materials and/or a vacuum gap. The vacuum gap may be a gap between two storage tanks that is a vacuum. The vacuum gap may serve as an insulator, such that the amount of heat exchange between the two storage tanks is reduced.

The external environmental conditions for a particular storage tank may include conditions that exist outside that particular storage tank. Specifically, these external environmental conditions may include environmental conditions, such as the temperature, pressure, and illumination of the environment around the storage tanks. In some embodiments, the storage vessel may be used to store cryogenic liquids, such as liquid oxygen, which has a boiling point of around −290° F. and liquid carbon dioxide, which has a boiling point of around −60° F. Therefore, if the storage vessel 101 is placed in normal environmental conditions, for example, at 45° F., the temperature inside the storage vessel 101 is significantly lower than the environmental conditions external to the storage vessel 101. Further, because the storage tanks 202, 204, 206 are concentrically arranged, the external conditions of the first storage tank 202 may be influenced by the external environmental conditions, such as the temperature outside the storage vessel 101 on one side, and by the temperature inside the second storage tank 204. It should be appreciated that the conditions external to a particular storage tank 202, 204, 206 or storage compartment 208 may influence the conditions inside the storage tank or storage compartment.

According to embodiments, the storage vessel 101 may utilize insulating material such as a multi-layer insulation in a vacuum gap, evacuated powder insulation or foam insulation, to protect the storage vessel 101 from external environmental conditions. Each storage tank 202, 204, 206 may be surrounded by an insulating material to protect each storage tank 202, 204, 206 from external environmental conditions that exist in the remaining storage tanks 202, 204, 206 and storage compartment 208. In some embodiments where space is limited, it may be desirable to utilize a smaller amount of space for insulating the storage tanks. Therefore, the insulating material may be a thin layer of multi-layer insulation, which surrounds each of the storage tanks 202, 204, 206. In various embodiments, the bottom end of the storage tanks 202, 204, 206 is also surrounded by insulating material, such that the conditions present in the storage compartment 208 may not affect the fluid in the storage tanks 202, 204, 206. By insulating the storage tanks 202, 204, 206, the fluid stored in the storage tanks 202, 204, 206 may be protected from conditions that may be present in the remaining storage tanks 202, 204, 206.

In one embodiment, each storage tank 202, 204, 206 may be surrounded by a vacuum jacket, which serves as an insulator for the storage tank it surrounds. Similar to the vacuum gap, the vacuum jacket may surround a storage tank such that a vacuum surrounds the storage tank, which serves as an thermal insulator to reduce the amount of heat exchange between the storage tank and the external environment surrounding the storage tank.

According to embodiments, the first storage tank 202 may be surrounded by a first insulating material 210, which may be configured to protect the first storage tank 202 and the contents inside the first storage tank 206 from the external environmental conditions that may influence the conditions, such as the temperature, inside the first storage tank 202. Similarly, the second storage tank 204 may be surrounded by a second insulating material 212, which may be configured to protect the second storage tank 204 and the contents inside the second storage tank 204 from the external environmental conditions exposed to the surface of the second storage tank 204 that is in contact with the second insulating material 212, such as the environmental conditions inside the first storage tank 202. It should be appreciated that the second insulating material 212 may also protect the first storage tank 202 from the environmental conditions present in the second storage tank 204. The third storage tank 206 may be surrounded by a third insulating material 214, which may be configured to protect the third storage tank 206 and the contents inside the third storage tank 206 from the external environmental conditions exposed to the surface of the third storage tank 204 that is in contact with the third insulating material 214. It should further be appreciated that the third insulating material 214 may also protect the second storage tank 204 from the environmental conditions present in the third storage tank 206. Hence, the insulating material may protect each storage tank from the external environmental conditions that surround that particular storage tank. As a result, any change in environmental conditions, such as a change in temperature that occurs in a particular storage tank may be isolated to that particular storage tank.

The insulating material may be any type of insulation known to those skilled in the art. Because the storage tanks may store cryogenic liquids, the insulating material should be able to insulate the storage tanks even at very low temperatures. In one embodiment, vacuum jackets may surround the storage tanks. A vacuum jacket may include multi-layer insulation, powder insulation, or foam insulation within the jacket, which serves as an insulator.

In order to maintain the pressure inside the storage vessel 101, and the individual storage tanks 202, 204, 206 and the storage compartment 208, a seal 236 may be placed at the top end of the storage vessel 101. Those skilled in the art may appreciate that the seal 236 may allow the fluid entry ports 220, 224, 228, 232 and fluid exit ports 222, 226, 230, 234 of the three storage tanks 202, 204, 206 and storage compartment 208 to pass through the seal 236, such that there is no leakage present between the fluid entry ports 220, 224, 228, 232 and fluid exit ports 222, 226, 230, 234 and the seal 236. It should be appreciated that the seal 236 may be made from a variety of materials that are known to those skilled in the art. It may be desirable to select a seal that may operate under the conditions in which the storage vessel will be utilized. For instance, in embodiments where the storage vessel 101 is being used to store liquid oxygen, a seal that is capable of operating under extremely cold temperatures may be used. Further details regarding the seal 236 will be described below in regard to FIG. 3.

Referring now to FIG. 3, the storage vessel 101 may include fluid entry ports 220, 224, 228, 232 and fluid exit ports 222, 226, 230, 234. In various embodiments, fluid entry ports 220, 224, 228, 232 and fluid exit ports 222, 226, 230, 234 extend out of the storage vessel 101 at the top end of the storage vessel 101, where they may be attached to the thermal conditioning module 104 or a fluid source.

According to embodiments, the first storage tank 202 may include the first fluid entry port 220, which may be used to supply fluid from the thermal conditioning module 104 to be stored in the first storage tank 202. The first storage tank 202 may also include the first fluid exit port 222, which may be configured to route the stored fluid from the first storage tank 202 to the thermal conditioning module 104.

Similarly, the second storage tank 204 may include the second fluid entry port 224, which may be used to supply fluid from the thermal conditioning module 104 to be stored in the second storage tank 204. The second storage tank 204 may also include the second fluid exit port 226, which may be configured to route the stored fluid from the second storage tank 226 to the thermal conditioning module 104. In addition, the third storage tank 206 may also include the third fluid entry port 228, which may be used to supply fluid from the thermal conditioning module 104 to be stored in the third storage tank 206. The third storage tank 206 may also include the third fluid exit port 230, which may route the stored fluid from the third storage tank 206 to the thermal conditioning module 104.

In various embodiments, the compartment fluid entry port 232 may extend from outside the storage vessel 101, pass through the inner most storage tank, and into the storage compartment 208. In some embodiments, the inner most storage tank may be the third storage tank 206. The compartment fluid entry port 232 may be used to supply a fluid from the thermal conditioning module 104 to the storage compartment 208. Further, the storage vessel 101 may include the compartment fluid exit port 234, which similar to the compartment fluid entry port 232, may extend from outside the storage vessel 101, and pass through the inner most storage tank to the storage compartment 208. In various embodiments, the fluid passing through the compartment fluid entry port 232 and compartment fluid exit port 234 may be affected by the conditions present inside the inner most storage tank. In order to reduce the effects caused by the conditions present inside the inner most storage tank, the compartment fluid entry port 232 and compartment fluid exit port 234 may be surrounded by insulating material as well.

As described above, the seal 236 may be configured to receive the fluid entry ports 220, 224, 228, 232 and fluid exit ports 222, 226, 230, 234, while also be configured to maintain the pressure inside each of the storage tanks 202, 204, 206 and the storage compartment 208. The seal 236 may include a first seal 237A configured to maintain the pressure inside the first storage tank 202, a second seal 237B configured to maintain the pressure in the second storage tank 204 and a third seal 237C configured to maintain the pressure in the third storage tank 206.

Referring now to FIG. 4, the storage vessel 101 may further include a plurality of sensors 402, 404, 406, 408 that may be configured to monitor the environmental conditions within various parts of the storage vessel 101. The first sensor 402 may be positioned within the first storage tank 202, and configured to monitor at least one of the temperature and pressure inside the first storage tank 202. Similarly, the second sensor 404 may be positioned within the second storage tank 204, the third sensor 406 may be positioned within the third storage tank 206, and the compartment sensor 408 may be positioned within the storage compartment 208 of the storage vessel 101. The second sensor 404, the third sensor 406, and the compartment sensor 408 may all be configured to monitor at least one of the temperature and pressure inside the second storage tank 204. It should be appreciated that any number of sensors may monitor any number of conditions inside each of the storage tanks 202, 204, 206 and storage compartment 208 of the storage vessel 101. Further, although not shown in the drawings, it should be understood that the sensors may be in direct or indirect communication with the electronic controller 114 that is configured to control the operation of the fuel system 100. For the sake of clarity, the fluid entry ports 220, 224, 228, 232 and fluid exit ports 222, 226, 230, 234 are marked with dotted lines.

Figure 5:
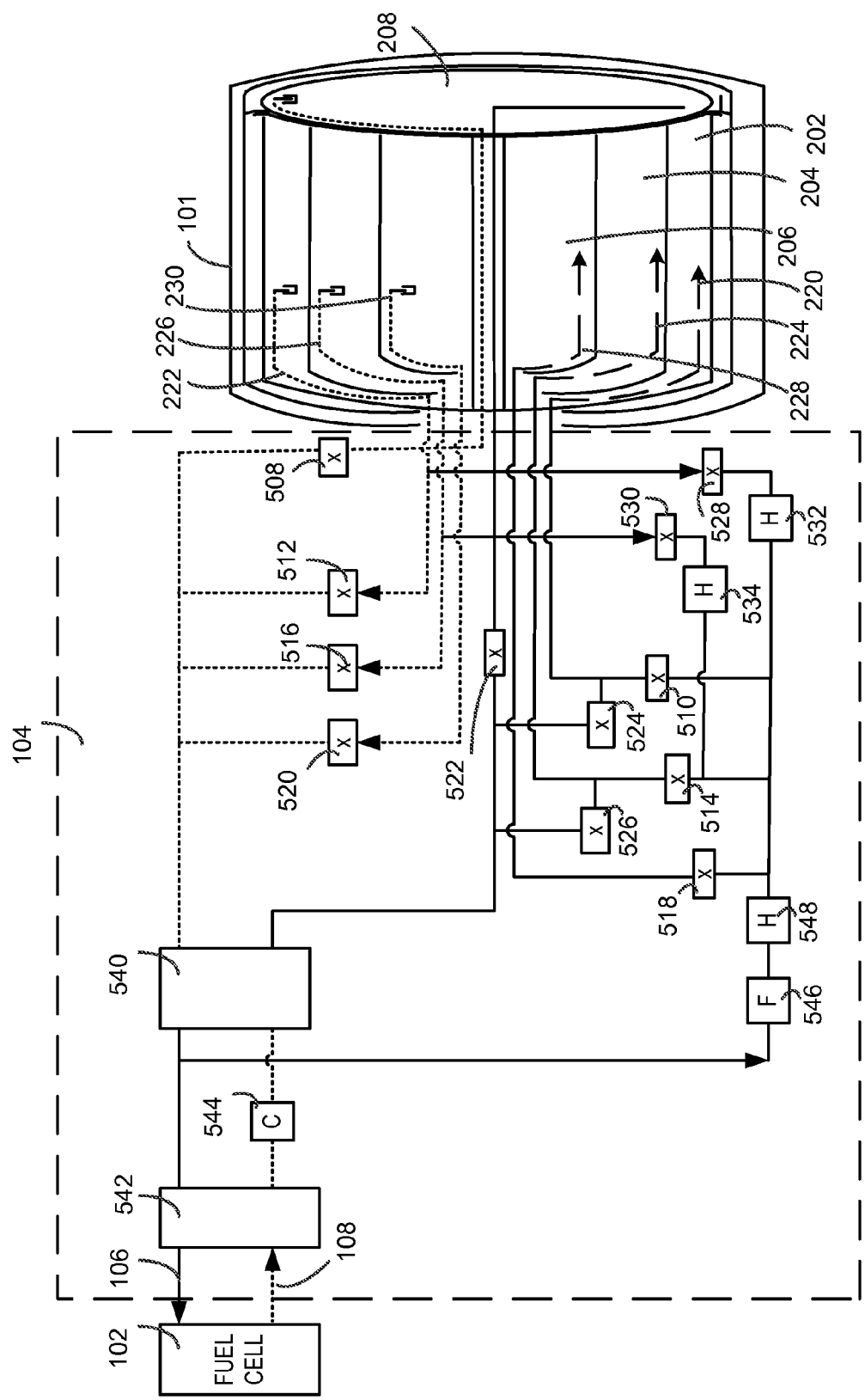
FIG. 5 is a block diagram illustrating a thermal conditioning module of a fuel system, according to embodiments described herein.

Referring now to FIG. 5, details regarding the thermal conditioning module 104 will now be described. It should be appreciated that the thermal conditioning module 104 described herein may be utilized for conditioning fluids in a wide variety of applications. However, for the sake of clarity, the present disclosure will describe the thermal conditioning module 104 as it is utilized within the fuel system 100 that utilizes gaseous oxygen as a reactant, and produces gaseous carbon dioxide as an effluent. The thermal conditioning module 104 may be configured to receive and condition gaseous oxygen, such that it is in a suitable condition for being supplied to the fuel cell 102. Further, the thermal conditioning module 104 may also be configured to receive and condition gaseous carbon dioxide such that it is in a suitable condition for being stored in the storage vessel.

According to embodiments, the thermal conditioning module 104 may include a first storage tank entry valve 510, configured to control the flow of the oxygen from the thermal conditioning module 104 to the first storage tank 202 via the first fluid entry port 220. A first storage tank exit valve 512 may be configured to control the flow of oxygen from the first storage tank 202 to the thermal conditioning module 104 via the first fluid exit port 222. Similarly, the thermal conditioning module 104 may also include a second storage tank entry valve 514, configured to control the flow of the oxygen from the thermal conditioning module 104 to the second storage tank 204 via the second fluid entry port 224. A second storage tank exit valve 516 may be configured to control the flow of oxygen from the second storage tank 204 to the thermal conditioning module 104 via the second fluid exit port 226. The thermal conditioning module 104 may also include a third storage tank entry valve 518, configured to control the flow of the oxygen from the thermal conditioning module 104 to the third storage tank 206 via the third fluid entry port 228. A third storage tank exit valve 520 may be configured to control the flow of oxygen from the third storage tank 206 to the thermal conditioning module 104 via the third fluid exit port 230. In addition, the thermal conditioning module 104 may also include a storage compartment entry valve 522 configured to control the flow of fluids to the storage compartment 208 via the compartment fluid entry port 232 (shown in FIG. 4) and a storage compartment exit valve 508 configured to control the flow of fluids from the storage compartment to the thermal conditioning module 104 via the compartment fluid exit port 234 (shown in FIG. 4).

The thermal conditioning module 104 may also include other valves, such as a first effluent valve 524, a second effluent valve 526, a first recycling valve 528 and a second recycling valve 530. The first effluent valve 524 may be configured to control the flow of the effluent from the fuel cell 102 into the first storage tank 202 of the storage vessel 101. When the first effluent valve 524 is open, the effluent is able to flow into the first storage tank. Similarly, the second effluent valve 526 may be configured to control the flow of the effluent from the fuel cell 102 into the second storage tank 204 of the storage vessel 101. When the second effluent valve 526 is open, the effluent is able to flow into the second storage tank 204. The rate at which the effluent is able to flow into the first storage tank 202 and the second storage tank 204 may be controlled by the electronic controller 114, which may be capable of opening and closing the first effluent valve 524 and second effluent valve 526, respectively. Further, the first recycling valve 528 may be configured to control the flow of fluid flowing through the first fluid exit port 222 back into the first storage tank 202. The second recycling valve 530 may be configured to control the flow of fluid flowing through the second fluid exit port 226 back into the second storage tank 204. The amount of fluid that may flow through the first recycling valve 228 and the second recycling valve 230 may be controlled by the electronic controller 114. Details regarding these valves and others are described below.

Further, the thermal conditioning module 104 may also include back-up valves that may operate in the event of a failure of another valve, and may also include various check valves, pressure release valves and other types of valves that may be utilized to improve the operation of the thermal conditioning module 104. In addition, the thermal conditioning module 104 may include a variety of regulators that may be utilized to regulate the flow of fluids to reduce any back pressure buildup and to supply the fluids at a desired pressure.

It should be appreciated that the valves, regulators, and other components utilized during the operation of the fuel system 100 may be controlled by the electronic controller 114. Further, the sensors described above in FIG. 4 and additional sensors positioned throughout the fuel system 100 that may monitor various operating conditions, may communicate information with the electronic controller 114, which may provide the electronic controller 114 with information to make decisions regarding the operation of the fuel system 100. Further details of the electronic controller 114 will be described later.

The thermal conditioning module 104 may also include a first heat exchanger 540, a second heat exchanger 542, a compressor 544 and a plurality of heating elements, such as a first heating element 532, a second heating element 534, and a storage tank heating element 548. Further, the thermal conditioning module 104 may include a boil off fan 546 that is electronically controlled by the electronic controller 114. It should be appreciated that the thermal conditioning module 104 may include other parts, components and/or module, such as regulators, valves, and fans that are not shown in FIG. 5. Details regarding the operation of the components associated with the thermal conditioning module 104 will be described in detail along with the operation of the fuel system 100 with regard to FIGS. 6-8.

According to embodiments, the thermal conditioning module 104 utilizes the heat exchangers 540, 542 to condition the carbon dioxide. Because of the temperature difference that exists between the gaseous oxygen and gaseous carbon dioxide, passing the two gases through the heat exchangers 540, 542 allows the gaseous oxygen to absorb the heat of the carbon dioxide. The gaseous oxygen that enters the storage vessel 101 may be slightly higher than −290° F., which is the boiling point of liquid oxygen. The gaseous carbon dioxide entering the thermal conditioning module 104 from the fuel cell 102 may be at around 60° F. Therefore, due to the large temperature difference between the two gases, efficient heat exchange may take place.

The thermal conditioning module 104 may be configured to efficiently cool down and liquefy the carbon dioxide produced by the fuel cell 102 using the gaseous oxygen supplied by the storage tank. Therefore, the gaseous carbon dioxide that enters the thermal conditioning module 104 is at 60° F. at 15 psi, and may need to be conditioned, such that the gaseous carbon dioxide is liquefied and stored in the storage vessel at below −60° F. at 100 psi. In order to obtain this, the thermal conditioning module 104 receives the gaseous oxygen and passes it through the first heat exchanger 540. Some of the gaseous oxygen is then passed through to the second heat exchanger 542 before it enters the fuel cell 102.

The gaseous carbon dioxide produced by the fuel cell 102 is initially supplied to the second heat exchanger 542 at about 60° F. at 15 psi, where the heat of the gaseous carbon dioxide is absorbed by the gaseous oxygen, thereby cooling the gaseous carbon dioxide to about −60° F. at 15 psi. The cooled gaseous carbon dioxide is then supplied to a compressor 544, which compresses the cooled carbon dioxide from 15 psi to 100 psi. It may be desirable to compress the carbon dioxide after cooling it, as it may be more energy efficient to do so. Next, the pressurized carbon dioxide is supplied to the second heat exchanger 542 at −60° F. at 100 psi, where it is further cooled and liquefied to liquid carbon dioxide at less than −60° F. As the pressurized carbon dioxide passes through the first heat exchanger 540, the gaseous oxygen that was supplied by the storage vessel 101 absorbs the heat of the pressurized carbon dioxide, hence cooling the carbon dioxide enough to liquefy it to liquid carbon dioxide.

Figure 6:
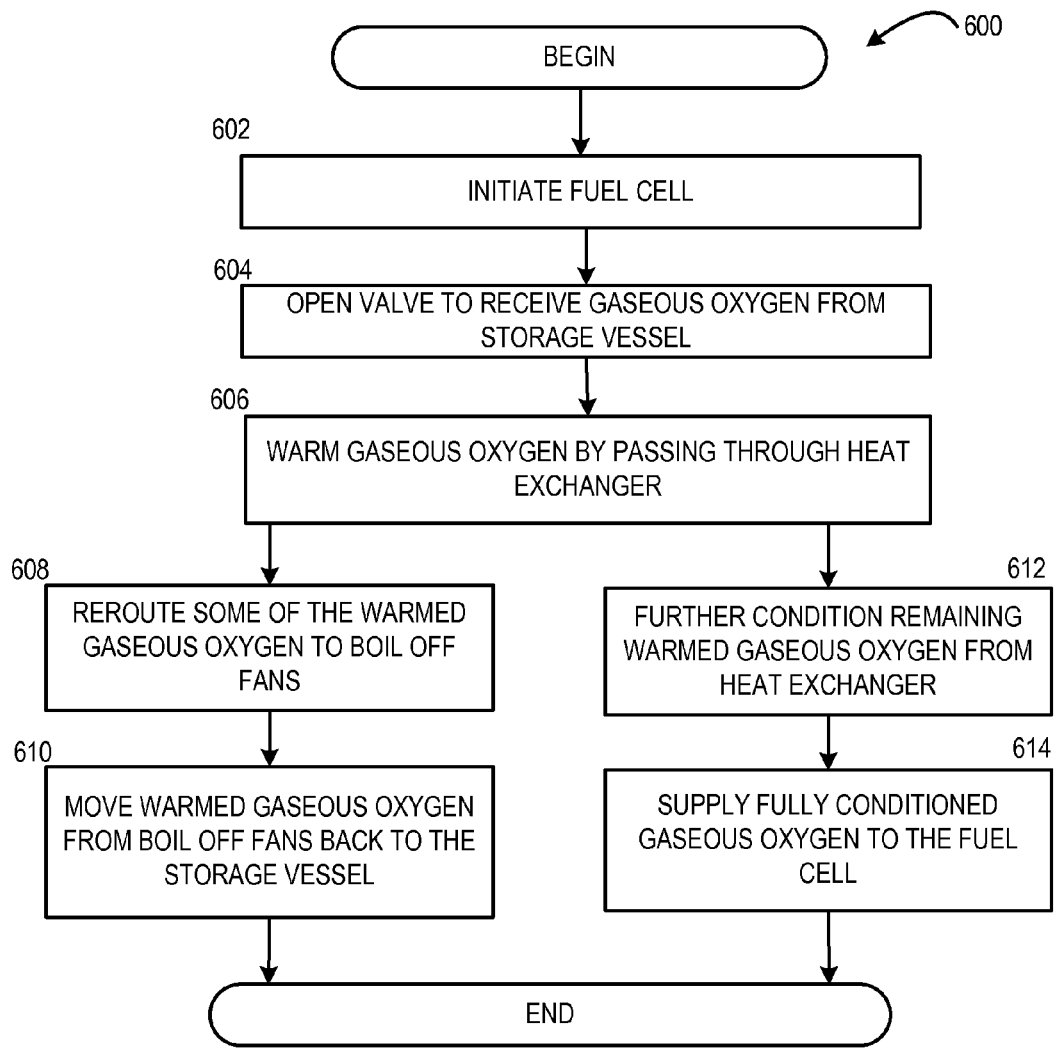
FIG. 6 is a logical flow diagram illustrating a routine for operating the fuel system, according to embodiments described herein.
Figure 7:
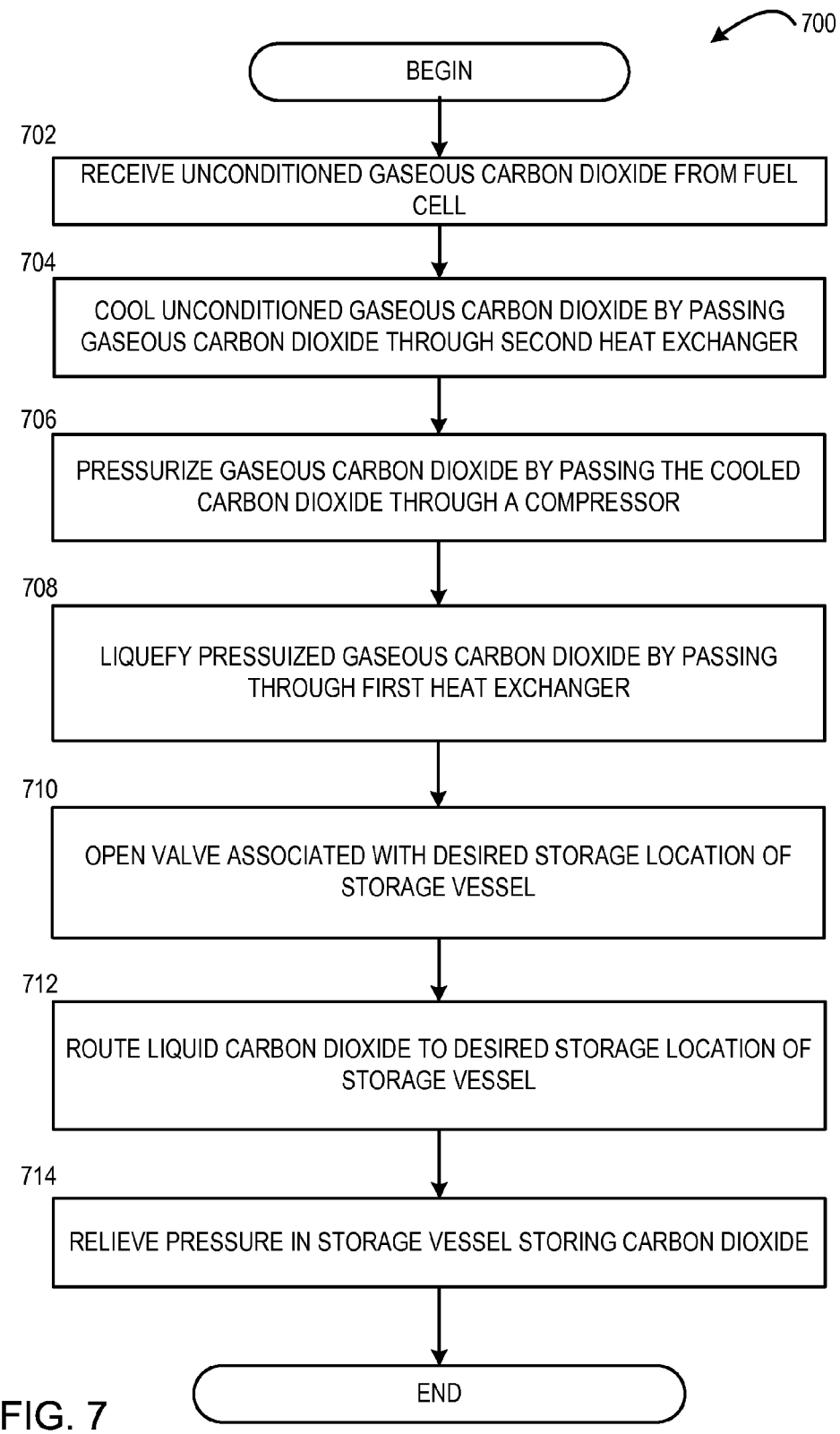
FIG. 7 is a logical flow diagram illustrating a routine for storing an effluent in a storage tank of the storage vessel, according to embodiments described herein.

FIGS. 6-8 describe various routines utilized by the fuel system 100 during operation. However, before the various routines are performed by the fuel system 100 during operation, the fuel system 100 performs various routines for preparing the fuel system 100 prior to use. For instance, the storage vessel 101 may need to be filled with liquid oxygen at a specific temperature and pressure. In one embodiment, the liquid oxygen is stored in all three storage tanks 202, 204, 206. Some gaseous oxygen may be present inside the three storage tanks 202, 204, 206 as well. Also, gaseous oxygen is stored in the storage compartment 208 at −60° F.

and 100 psi, to prevent the liquid carbon dioxide from freezing and to reduce any adverse performance issues due to back pressure being generated in the fuel system 100. Further, the valves that control the flow of fluid from the storage tanks 202, 204, 206 to the thermal conditioning module 104 are closed.

Referring now to FIG. 6, a routine 600 for operating the fuel system 100 is described. The routine 600 begins at operation 602, where the fuel cell 102 is initiated. As the fuel cell 102 is initiated at operation 602, the routine 600 proceeds to operation 604, where the electronic controller 114 may open the first storage tank exit valve 512. As the first storage tank exit valve 512 is opened, unconditioned gaseous oxygen present in the first storage tank 202 may flow through the first fluid exit port 222, through the first storage tank exit valve 512, and into the first heat exchanger 540.

From operation 604, the routine 600 proceeds to operation 606, where the unconditioned gaseous oxygen is supplied to the first heat exchanger 540. As described above, the gaseous oxygen absorbs some of the heat of the pressurized carbon dioxide that is partially conditioned by the second heat exchanger 542 and the compressor 544. As the gaseous oxygen and the pressurized carbon dioxide pass through the first heat exchanger 540, the unconditioned gaseous oxygen is warmed by absorbing the heat of the pressurized carbon dioxide. From operation 606, the routine 600 proceeds to split to operation 608, and operation 612.

At operation 608, a portion of the warmed oxygen is supplied to at least one boil off fan, such as the boil off fan 546. At operation 608, some of the warmed gaseous oxygen is routed back towards the storage vessel 101. In the present embodiment, the warmed gaseous oxygen is routed back to the storage tank 101 that is supplying the gaseous oxygen to the thermal conditioning module, which according to the present embodiment, is the first storage tank 202. The boil off fan 546 may be utilized to build a pressure difference, such that some of the warmed gaseous oxygen coming out of the first heat exchanger 540 is rerouted back to the first storage tank 202.

From operation 608, the routine 600 proceeds to operation 610, where the warmed gaseous oxygen is routed through the storage tank heating element 548, such that the warmed gaseous oxygen may be warmed further before entering the first storage tank 202. The conditioned gaseous oxygen may then pass through at least one of the storage tank fluid entry valves 510, 514, 518. The fuel system 100 may determine the storage tank from which to receive the gaseous oxygen, and may therefore open the valve associated with the fluid entry port of that particular storage tank. As described above, the first storage tank 202 is being used to supply the oxygen and therefore, the electronic controller 114 may open the first storage tank fluid entry valve 510, allowing the conditioned gaseous oxygen from the storage tank heating element 548 to be routed back to the first storage tank 202, where the conditioned gaseous oxygen may bubble through the liquid oxygen stored in the first storage tank 202.

It may be appreciated that the boil off fan 546 may operate at a fixed speed to generate a fixed flow rate or may be operated at a higher or lower speed to either increase or decrease the flow rate of gaseous oxygen being routed to the first storage tank, respectively. It should be appreciated that depending upon the amount of power demanded, the electronic controller 114 may vary the speed of the one boil off fan 546 accordingly. For instance, when the fuel cell 102 needs to produce more power, the electronic controller 114 may increase the speed of the boil off fan speed 546, thereby routing more gaseous oxygen through the boil off fan 546 and thus, more gaseous oxygen through the first storage tank 202, and eventually to the fuel cell 102 via the conditioning process described herein.

From operation 606, the routine 600 also proceeds to operation 612, where the remaining warmed gaseous oxygen that passed through the first heat exchanger 540 may be received by the second heat exchanger 542. As described above, the remaining warmed gaseous oxygen is further conditioned by absorbing heat from the unconditioned carbon dioxide supplied by the fuel cell 102 that also passes through the second heat exchanger 542.

From operation 612, the routine 600 proceeds to operation 614, where the conditioned remaining gaseous oxygen is supplied to the fuel cell 102. It may be appreciated that the conditioned gaseous oxygen passes through a pressure regulator (not shown) prior to being supplied to the fuel cell 102 via passage 106. The pressure regulator may reduce the pressure at which the conditioned remaining gaseous oxygen is being supplied to the fuel cell 102. The routine 600 continues to operate until the electronic controller 114 determines that the first storage tank 202 is not supplying enough gaseous oxygen for the desired functioning of the fuel cell 102.

Referring now to FIG. 7, a routine 700 for conditioning the gaseous carbon dioxide produced by the fuel cell 102 is described. The routine 700 begins at operation 702, where the thermal conditioning module 104 receives the unconditioned gaseous carbon dioxide from the fuel cell 102 via passage 108. From operation 702, the routine 700 proceeds to operation 704, where the unconditioned carbon dioxide received from the fuel cell 102 is cooled by passing the unconditioned carbon dioxide through the second heat exchanger 542. As described above, cooler oxygen supplied from the first heat exchanger 540 passes through the second heat exchanger 542 as well, and absorbs some of the heat of the unconditioned carbon dioxide.

From operation 704, the routine 700 proceeds to operation 706, where the cooled gaseous carbon dioxide is pressurized by passing the cooled carbon dioxide through the compressor 544. From operation 706, the routine 700 proceeds to operation 708, where the pressurized carbon dioxide then passes through the first heat exchanger 540, where the pressurized carbon dioxide is converted to liquid carbon dioxide. As described above, the unconditioned gaseous oxygen supplied from at least one of the storage tanks 202, 204, 206 absorbs the heat of the pressurized carbon dioxide as it passes through the first heat exchanger 540, liquefying the carbon dioxide.

From operation 708, the routine proceeds to operation 710, where the electronic controller 114 determines where the liquefied carbon dioxide is to be stored. Initially, the electronic controller 114 may open the compartment fluid entry valve 522 to store the liquefied carbon dioxide in the storage compartment 208. However, once the storage compartment 208 is filled with the liquefied carbon dioxide and the thermal conditioning module 104 has conditioned the first storage tank 202, such that the first storage tank 202 may store the liquefied carbon dioxide, the electronic controller 114 may close the compartment fluid entry valve 522 and open the first storage tank fluid entry valve 510.

From operation 710, the routine 700 proceeds to operation 712, where the liquid carbon dioxide is routed to the desired storage location of the storage vessel 101. In the present embodiment, the desired storage location of the storage vessel is the location whose fluid entry valve is open. In various embodiments, once the first storage tank is also filled with liquid carbon dioxide, the electronic controller 114 may close the first storage tank fluid entry valve 510 and open the second storage tank fluid entry valve 514, such that the liquefied carbon dioxide may be stored in the second storage tank 204. From operation 712, the routine 700 proceeds to operation 714, where the pressure of the carbon dioxide tank being filled is controlled to a safe pressure by relieving the pressure periodically and venting the oxygen (and carbon dioxide) gases in the tank through the storage compartment exit valve 508, the first storage tank exit valve 512, or the second storage tank exit valve 516 to the stream entering the first heat exchanger 540.

Referring now to FIG. 8, a routine 800 for receiving gaseous oxygen from the second storage tank 204 after the first storage tank 202 is not supplying enough gaseous oxygen to the fuel cell 102 and conditioning the first storage tank 202 for storing liquid carbon dioxide is described. The routine 800 begins at operation 802, where the thermal conditioning module 104 is routing unconditioned gaseous oxygen from the first storage tank to the first heat exchanger 540 via the first fluid exit port valve 512. From operation 802, the routine 800 proceeds to operation 804, where the electronic controller 114 determines that the first storage tank 202 is not supplying enough gaseous oxygen. The electronic controller 114 utilizes the first sensor 402, amongst other components to gather information such as the remaining liquid oxygen volume to determine if more gaseous oxygen can be supplied by the first storage tank 202. Upon determining that the first storage tank 202 cannot supply enough gaseous oxygen, the electronic controller 114 may open the second storage tank fluid exit valve 516. Depending upon how much gaseous oxygen is being supplied by the first storage tank 202, the electronic controller 114 may controllably open the second storage tank fluid exit valve 516 of the second storage tank 204 to provide enough gaseous oxygen from the second storage tank 204 to make up the difference between the gaseous oxygen supply demanded by the fuel cell 102 and that being supplied by the first storage tank 202. As the first storage tank 202 supplies less unconditioned gaseous oxygen, the electronic controller 114 may gradually open the second storage tank fluid exit valve 516 further, thereby increasing the flow rate of the unconditioned gaseous oxygen being supplied from the second storage tank 204.

From operation 804, the routine 800 proceeds to operation 806, where the electronic controller 114 may close the first storage tank fluid exit port valve 512 and open the first reconditioning valve 528. By doing so, the gaseous oxygen within the first storage tank 202 may now circulate through the first storage tank 202. The gaseous oxygen may leave the first storage tank 202 through the first fluid exit port 222, the first reconditioning valve 528, the first heating element 532, the first fluid entry port 510, and circulate back into the first storage tank 202. The first heating element 532 may be configured to heat the gaseous oxygen as it circulates around the storage tank, thereby supplying heat to the first storage tank 202. It should be appreciated that the amount of heat supplied by the first heating element 532 may be controlled by the electronic controller 114, such that if the temperature in the first storage tank 202 needs to be quickly increased, the first heating element 532 may operate at a higher heat level. As the gaseous oxygen is being heated during the cycle, the temperature of the first storage tank 202 is increasing. The conditioning process may continue until the first storage tank 202 is ready to receive liquid carbon dioxide. Upon completely conditioning the first storage tank, the first reconditioning valve 428 may be closed. It may be appreciated that the first storage tank is conditioned to a prespecified temperature such that the first storage tank is in condition to receive the liquid effluent. In various embodiments, the prespecified temperature should be greater than the melting point of the effluent and less than the boiling point of the effluent such that the effluent does not freeze or boil inside the conditioned first storage tank.

From operation 806, the routine 800 proceeds to operation 808, where the warmed gaseous oxygen from the second storage tank 204 is passed through the first heat exchanger 540. From operation 808, the routine 800 splits and proceeds to operation 810 and operation 812. At operation 810, the warmed gaseous oxygen from the second storage tank 204 is rerouted back to the storage vessel 101 via the boil off fans. As described above, the warmed gaseous oxygen is rerouted back to the second storage tank 204, causing the second storage tank 204 to supply more gaseous oxygen to the first heat exchanger 540.

From operation 808, the routine 800 also proceeds to operation 812, where the remaining warmed gaseous oxygen is further conditioned by passing the warmed gaseous oxygen through the second heat exchanger 542, similar to operation 612, as described above. The routine 800 then proceeds to operation 814, where the conditioned gaseous oxygen is supplied to the fuel cell 102. Finally, the routine 800 then proceeds to operation 816, where the gaseous carbon dioxide is conditioned and supplied to the storage vessel 101. Details of how the gaseous carbon dioxide produced from the fuel cell 102 is conditioned to liquid carbon dioxide stored in the storage vessel has been described above in FIG. 7. From operation 816, the routine 800 then proceeds to operation 818, where the liquid carbon dioxide is stored in the conditioned first storage tank 202. In various embodiments, the electronic controller 114 may determine that the storage compartment 208 is full via the sensor positioned within the storage compartment 208. Upon determining that the storage compartment 208 is full, the electronic controller 114 may close the compartment fluid entry port valve 522 and open the first storage tank fluid entry valve 510, rerouting the liquid carbon dioxide to the conditioned first storage tank 202. The routine 800 then ends.

It should be appreciated that the size of the storage vessel 101 and the size of the respective storage tanks 202, 204, 206 and storage compartments 208 are designed according to the particular application they are utilized for. For instance, in the present embodiment, the fuel system 100 may be configured to accommodate enough liquid carbon dioxide produced by the fuel cell 102 from the time the fuel cell 102 is initiated up to the time the first storage tank 202 no longer contains enough liquid oxygen to supply to the fuel cell 102 and the time it takes for the fuel system 102 to condition the first storage tank 202, such that it may be able to store the liquid carbon dioxide. Additionally, the storage compartment 208 may be configured to store a prespecified amount of the liquid carbon dioxide even after the thermal conditioning module begins to receive the gaseous oxygen from the second storage tank 204. The prespecified amount of carbon dioxide may be the amount of carbon dioxide produced by the fuel cell 102 from the time the first storage tank 202 begins to start supplying gaseous oxygen to the thermal condition module 104 up to the time the first storage tank 202 stops supplying gaseous oxygen to the thermal conditioning module 104, and the amount of carbon dioxide produced by the fuel cell 102 from the time the second storage tank 204 starts supplying gaseous oxygen to the thermal conditioning module 104 up to the time the first storage tank 202 is conditioned and ready to store liquid carbon dioxide.

According to various embodiments, the mass, volume and density of the storage vessel 101 may be an important consideration during the construction and application of the storage vessel 101. For instance, in a fuel system for an underwater vehicle, the density of the fuel system and its individual components may be a consideration for maintaining the buoyancy of the vehicle. In such embodiments, the mass of the fluid being stored in the storage tanks 202, 204, 206, the mass of the empty storage vessel 101, and the mass of the fluid being stored in the storage compartment 208 may all be relevant in determining the mass and dimensions of the storage vessel 101. In addition, the material used, the thickness of insulation, and the thickness of the walls of the storage tanks 202, 204, 206 may be considerations that may be taken into account before construction of the storage vessel 101 begins.

It should be appreciated that that the present disclosure is not limited to a fuel system 102, but to any technology that may be utilized for conditioning fluids. Further, those skilled in the art will appreciate that the scope of the present disclosure includes, but is not limited to applications for conditioning a first fluid by absorbing the heat of a second fluid, wherein the second fluid has a higher boiling point than the first fluid.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A fuel system, comprising:
   a fuel cell;
   a storage vessel configured to store a first fluid to be supplied to the fuel cell and a second fluid supplied by the fuel cell, wherein the first fluid comprises a liquid first fluid and a gaseous first fluid and wherein the second fluid comprises a liquid second fluid and a gaseous second fluid, the first fluid being oxygen and the second fluid being carbon dioxide; and
   a thermal conditioning module, the thermal conditioning module configured to
   receive the gaseous first fluid from the storage vessel,
   receive the gaseous second fluid from the fuel cell,
   condition the gaseous first fluid stored in the storage vessel by absorbing heat from the gaseous second fluid, such that the fuel cell receives the gaseous first fluid from the thermal conditioning module, and
   convert the gaseous second fluid received from the fuel cell to the liquid second fluid and storing the liquid second fluid in the storage vessel.

2. The fuel system of claim 1, wherein the thermal conditioning module comprises a first heat exchanger configured to receive the gaseous first fluid from the storage vessel and further configured to liquefy the gaseous second fluid into the liquid second fluid by allowing the gaseous first fluid to absorb heat from the gaseous second fluid.

3. The fuel system of claim 2, wherein the storage vessel comprises a first storage tank, a second storage tank, a third storage tank, and a storage compartment, the first, second, and third storage tanks being concentrically arranged with respect to each other so that the third storage tank is nested inside of the second storage tank and the second storage tank is nested inside of the first storage tank, the first, second, and third storage tanks configured to store the liquid first fluid, and the storage compartment configured to store the liquid second fluid.

4. The fuel system of claim 3, wherein the first storage tank and the second storage tank are configured to store the first fluid and upon removing the first fluid from the first storage tank, store the second fluid in the first storage tank.

5. The fuel system of claim 4, wherein the second storage tank may be configured to store the second fluid upon removing the first fluid from the second storage tank.

6. The fuel system of claim 1, wherein the thermal conditioning module may be configured to control the flow of the first fluid and the second fluid out of and into the storage vessel using a plurality of valves.

7. The fuel system of claim 3, wherein the storage compartment is configured to store at least a prespecified amount of the second fluid even after the thermal conditioning module begins to receive the first fluid from the second storage tank, wherein the prespecified amount of the second fluid comprises the amount of the second fluid that is produced by the fuel system from the time the first storage tank begins to supply the first fluid to the thermal conditioning module to the time the first storage tank stops supplying the first fluid to the thermal conditioning module, and the amount of the second fluid that is produced by the fuel system from the time the thermal conditioning module begins to receive the first fluid from the second storage tank up to the time the first storage tank is conditioned and ready to store the second fluid.

8. A fuel system, comprising:
   a thermal conditioning module configured to
   receive a gaseous first fluid from a storage vessel, the first fluid being oxygen;
   receive a gaseous second fluid from a fuel cell, the second fluid being carbon dioxide;
   condition the gaseous first fluid from the storage vessel by absorbing heat from the gaseous second fluid to create a conditioned gaseous first fluid;
   provide a first portion of the conditioned gaseous first fluid to the fuel cell;
   provide a second portion of the conditioned gaseous first fluid back to the storage vessel;
   convert the gaseous second fluid received from the fuel cell to a liquid second fluid; and
   provide the liquid second fluid to the storage vessel.

9. The fuel system of claim 8, further comprising:
   the fuel cell; and
   the storage vessel configured to store the gaseous first fluid, the conditioned gaseous first fluid, and the liquid second fluid.

10. The fuel system of claim 9, wherein the storage vessel is further configured to store a liquid first fluid.

11. The fuel system of claim 10, further comprising:
    an electronic controller communicatively coupled to the thermal conditioning module and operative to
    remove the liquid first fluid from the storage vessel; and
    upon removing the liquid first fluid from the storage vessel, condition the storage vessel for receiving the liquid second fluid.

12. The fuel system of claim 10, wherein the storage vessel comprises a first storage tank, a second storage tank, a third storage tank, and a storage compartment, the first, second, and third storage tanks being concentrically arranged with respect to each other so that the third storage tank is nested inside of the second storage tank and the second storage tank is nested inside of the first storage tank, the first, second, and third storage tanks configured to store the liquid first fluid, and the storage compartment configured to store the liquid second fluid.

13. The fuel system of claim 12, wherein the second storage tank may be configured to store the liquid second fluid upon removing the liquid first fluid from the second storage tank.

14. The fuel system of claim 12, wherein the storage compartment is configured to store at least a prespecified amount of the liquid second fluid even after the thermal conditioning module begins to receive the gaseous first fluid from the second storage tank, wherein the prespecified amount of the liquid second fluid comprises the amount of the liquid second fluid that is produced by the fuel system from the time the first storage tank begins to supply the gaseous first fluid to the thermal conditioning module to the time the first storage tank stops supplying the gaseous first fluid to the thermal conditioning module, and the amount of the liquid second fluid that is produced by the fuel system from the time the thermal conditioning module begins to receive the gaseous first fluid from the second storage tank up to the time the first storage tank is conditioned and ready to store the liquid second fluid.

15. The fuel system of claim 8, wherein the thermal conditioning module may be configured to control the flow of the gaseous first fluid and the liquid second fluid out of and into the storage vessel using a plurality of valves.

16. A fuel system, comprising:
a fuel cell;
a storage vessel comprising
a first storage tank and a second storage tank, each configured to store a first fluid to be supplied to the fuel cell, the first fluid being oxygen, and
a storage compartment configured to store a liquid second fluid supplied by the fuel cell, the second fluid being carbon dioxide; and
a thermal conditioning module configured to
receive the first fluid from the storage vessel,
receive a gaseous second fluid from the fuel cell,
condition the first fluid received from the storage vessel by absorbing heat from the gaseous second fluid received from the fuel cell to create a conditioned first fluid,
provide a first portion of the conditioned first fluid to the fuel cell from the thermal conditioning module,
provide a second portion of the conditioned first fluid back to the storage vessel,
convert the gaseous second fluid received from the fuel cell to the liquid second fluid, and
provide the liquid second fluid to the storage vessel for storage in the storage compartment.

17. The fuel system of claim 16, wherein the first fluid comprises a liquid first fluid and a gaseous first fluid.

18. The fuel system of claim 17, wherein the thermal conditioning module comprises a boil off fan, wherein the conditioned first fluid comprises conditioned gaseous first fluid, and wherein being configured to provide the second portion of the conditioned gaseous first fluid back to the storage vessel comprises being configured to create a pressure differential utilizing the boil off fan to provide the second portion of the conditioned gaseous first fluid back to the storage vessel.

19. The fuel system of claim 18, further comprising an electronic controller operative to vary a speed of the boil off fan to control an amount of the second portion of the conditioned gaseous first fluid provided back to the storage vessel.

20. The fuel system of claim 19, wherein the electronic controller is further operative to detect that the fuel cell needs to produce more power, and in response to detecting that the fuel cell needs to produce more power, increasing the speed of the boil off fan to increase the amount of the second portion of the conditioned gaseous first fluid provided back to the storage vessel.

* * * * *